United States Patent

[11] 3,590,761

[72] Inventor Grevis Hardie Parkes
 5 Stanhope Lodge, Queens Road, West Cowes, Isle of Wight, England
[21] Appl. No. 777,769
[22] Filed Nov. 21, 1968
[45] Patented July 6, 1971

[54] UNDERWATER GENERATION OF GAS
 26 Claims, 8 Drawing Figs.
[52] U.S. Cl. .................................................. 114/16,
 60/39.57, 114/.5
[51] Int. Cl. ............................................. B63g 8/00
[50] Field of Search.................................. 114/16, .5;
 103/249, 250; 60/39.57, 39.58

[56] References Cited
UNITED STATES PATENTS
3,090,345  5/1963  Hulbert  115/6.1
3,329,118  7/1967  Strader  114/16(A)

Primary Examiner—Trygve M. Blix
Attorney—Cushman, Darby and Cushman

ABSTRACT: A submersible system for converting liquid monofuel into gas comprises a fuel storage tank, a combustion chamber for the fuel, a variable-delivery fuel pump operable to deliver a quantity of fuel to the combustion chamber and means for distributing gas generated by decomposition of the fuel, the combustion space within the combustion chamber being subjected to the local ambient hydrostatic pressure of the water in which the system is submerged.

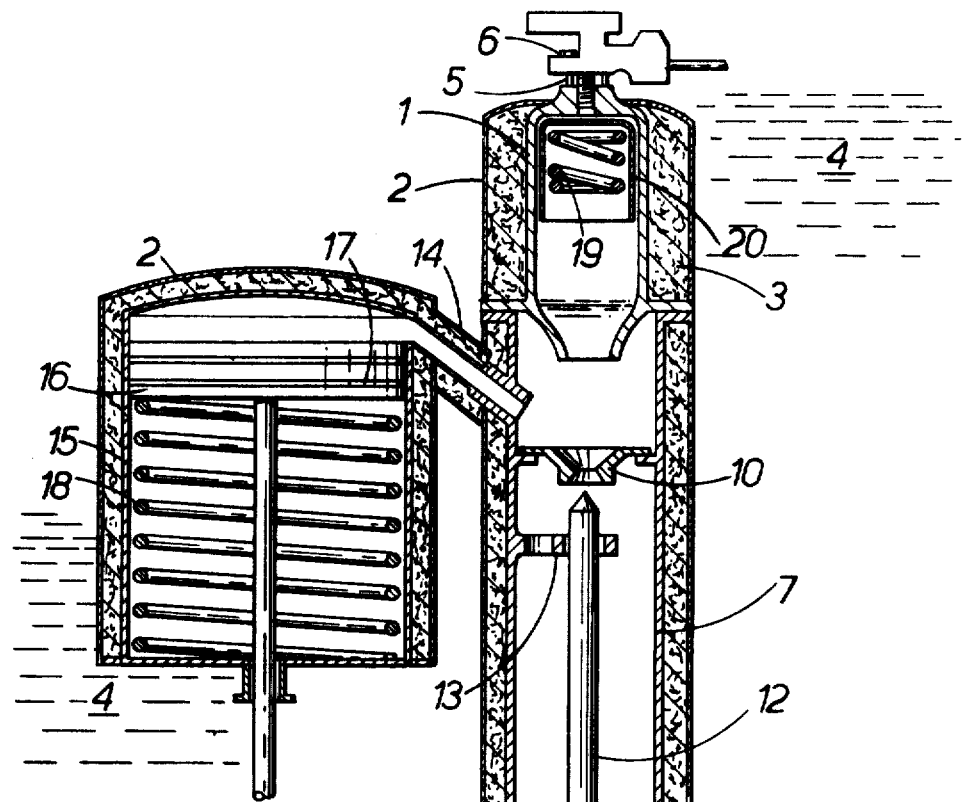
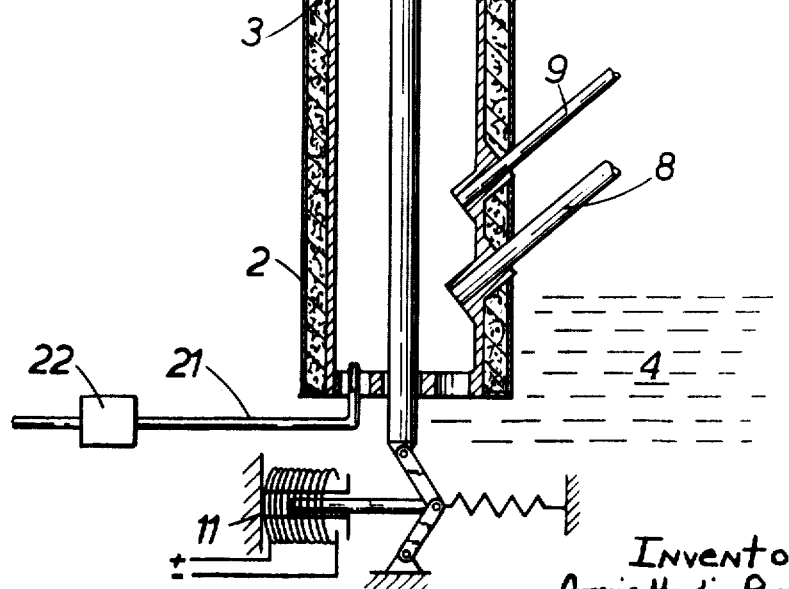
PATENTED JUL 6 1971
3,590,761
SHEET 1 OF 6
Fig.1.
Inventor
Grevis Hardie Parkes
By Cushman, Darby & Cushman
Attorneys

PATENTED JUL 6 1971

Inventor
Grevis Hardy Parkes
By Cushman, Darby & Cushman
Attorneys

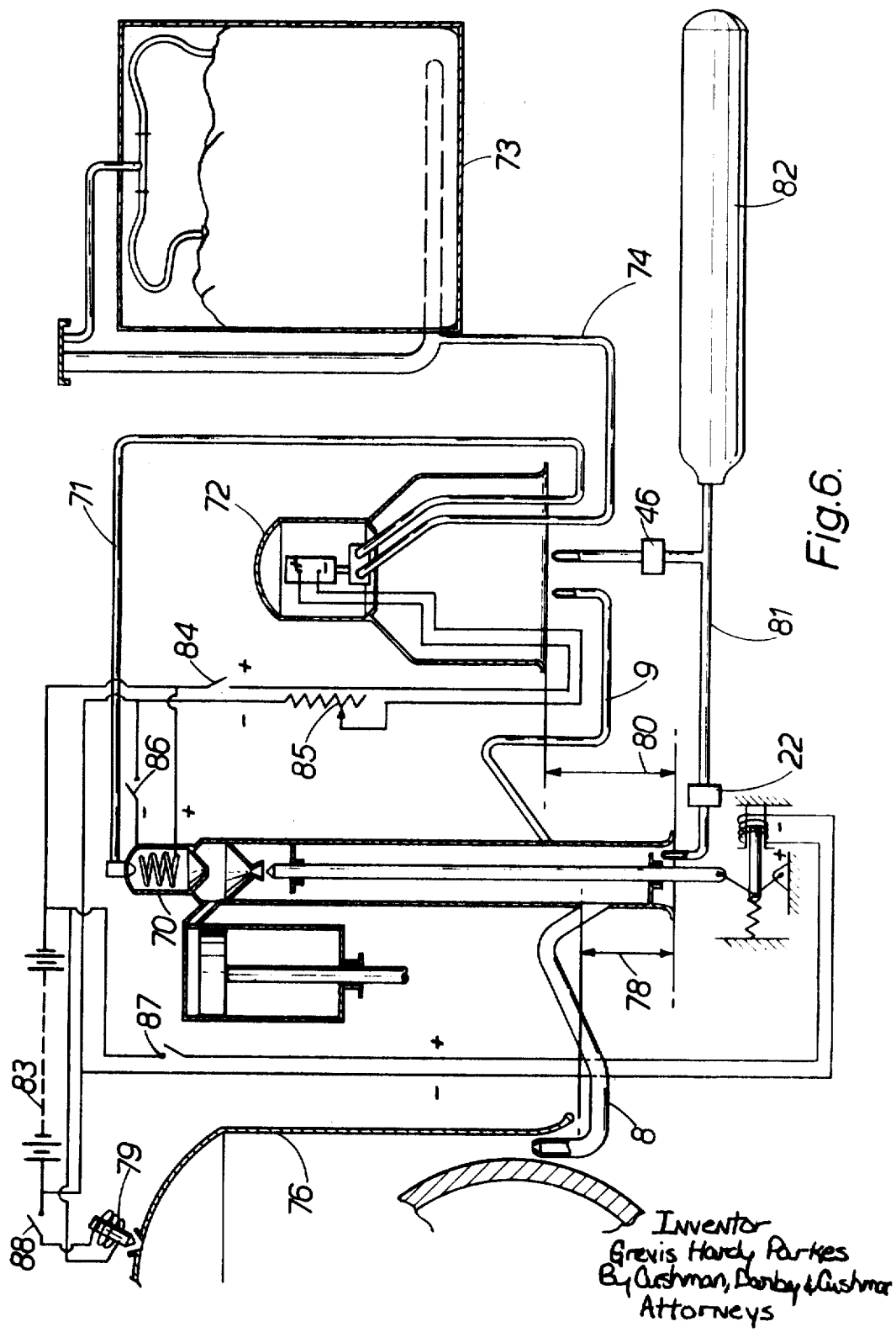

UNDERWATER GENERATION OF GAS

This invention relates to a submersible system for converting a liquid monofuel into gas. The submersible system according to the invention may be used for discharging water from ballast tanks of a submarine vessel or machine so as to vary its submerged displacement, and thereby render it capable of navigation during a deep diving operation.

According to the invention a submersible system for converting a liquid monofuel into gas comprises a fuel storage tank, a combustion chamber for the fuel, a variable delivery fuel pump operable to deliver a quantity of fuel to the combustion chamber and means for distributing gas generated by decomposition of the fuel, the combustion space within the combustion chamber being subjected to the local ambient hydrostatic pressure of the water in which the system is submerged. Preferably, the fuel is delivered at a rate which is dependent on the local ambient hydrostatic pressure.

According to established laws of thermochemistry a mass of suitable liquid monofuel for example iso-propyl-nitrate $(CH_3)_2$ CHO $NO_2$) or normal-propyl-nitrate $(CH_3CH_2CH_2ONO_2)$ may be caused to undergo spontaneous decomposition into an equivalent mass of hot product gas, if it is introduced into a chamber (of predetermined volume) wherein both temperature and absolute pressure of any gas already present, have both been previously raised above certain minimum values.

To initiate and sustain such steady exothermic decomposition (or combustion) of a given quantity of monofuel, it is necessary to introduce it into the combustion chamber in the form of a finely divided spray; the fuel droplets size, and their exit velocity from the spray nozzle, being selected in any given design to suit a particular gas density value in the combustion chamber under certain conditions. During such steady combustion of the incoming monofuel, the pressure of combustion within the chamber must be maintained above a certain minimum value; if it falls below such minimum value, self-sustained decomposition will cease.

This maintenance of a required pressure may be achieved either by means of a restricted gas passage exit area relative to a particular fuel mass flow condition) or, alternatively, by freely exhausting the hot product gas into a surrounding fluid region, the local ambient pressure of which is greater than the required minimum absolute pressure necessary to sustain satisfactory combustion in the chamber.

The foregoing principle of monofuel ignition and self-sustained decomposition is satisfied when operating conditions are such that the hydrostatic pressure at the gas generator system exhaust outlet to the surrounding water pressure region is greater than the required minimum combustion pressure for any particular monofuel. Thus, for example, an exhaust back pressure not less than 250 p.s.i.a. (corresponding to an hydrostatic head of approximately 500 feet of water) may suffice to ensure ignition of a given monofuel (in a preheated gas atmosphere in the chamber); followed by stable and complete, self-sustaining decomposition of the incoming fuel, so long as the supply to the injector is maintained.

One form of the system will now be described by way of example, in conjunction with the accompanying diagrammatic drawings, in which:

FIG. 1 is a section through the combustion chamber and standpipe assembly.

FIGS. 2a and 2b are elevation views partially in section showing how fuel is supplied to the tank and how the fuel supply is closed, respectively.

FIG. 6 shows the gas, hydraulic and electric circuits and the relationship of the various units of the complete system.

Figure 2:
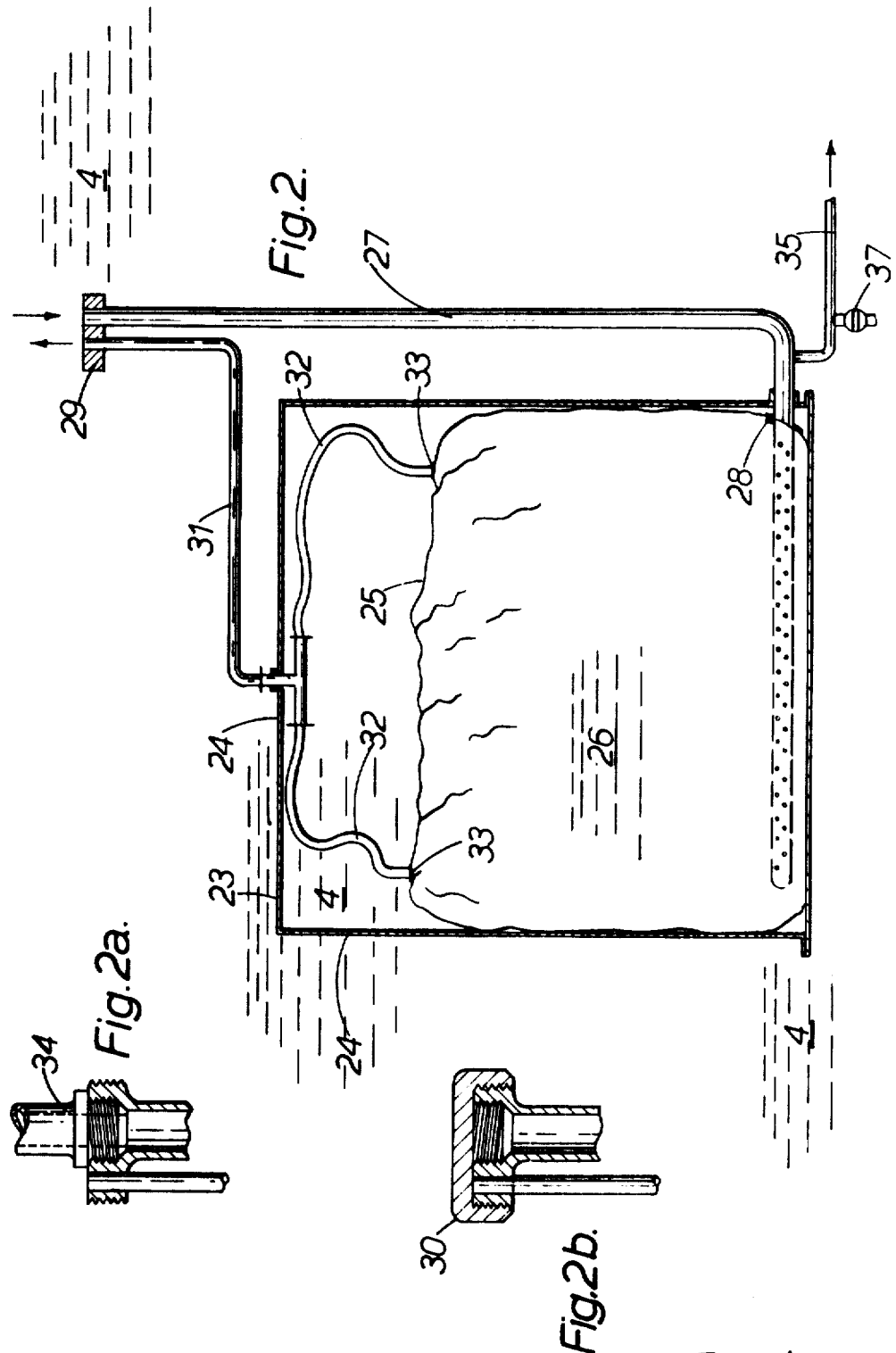
FIG. 2 shows the fuel tank arrangement.

In FIG. 1, a cylindrical metal combustion chamber 1, mounted with its axis vertical and made of high-temperature-resistant alloy steel, is surrounded by an outer sheath of thin perforated metal 2. The annular space between these two parts is filled with suitable porous packing material 3 (for example, steel wool). When the system submerges, the surrounding water 4 penetrates the interstices of this packing.

Formed in the top of the combustion chamber, where the latter protrudes through the upper end of the outer sheath, is an external boss having a hole down the middle, which communicates with the interior. The top end of this hole is counterbored to provide a spherical seating of narrow face width at its inner end, to suit a matching external seat formed on the lower end of the injector (see FIG. 4 Studs 5 are secured in the boss and locate the injector, which is tightened to its seat by nuts 6.

The lower end of the combustion chamber is conical or domed and has one or more gas exit holes passing through to the inside of the top of the standpipe 7, of large internal volume relative to the combustion chamber volume. This pipe is rigidly attached (in a gastight manner) at its top end to the lower end of the combustion chamber. Communicating with the inside of the standpipe (which, at its lower end, is open to the surrounding water pressure region) is a pipe 8 intended to supply product gas to a buoyancy tank. The level of intake of this pipe, in the wall of the standpipe as shown, is located below the level of the water discharge vents in the bottom walls of the particular buoyancy tank which it serves.

Figure 3:
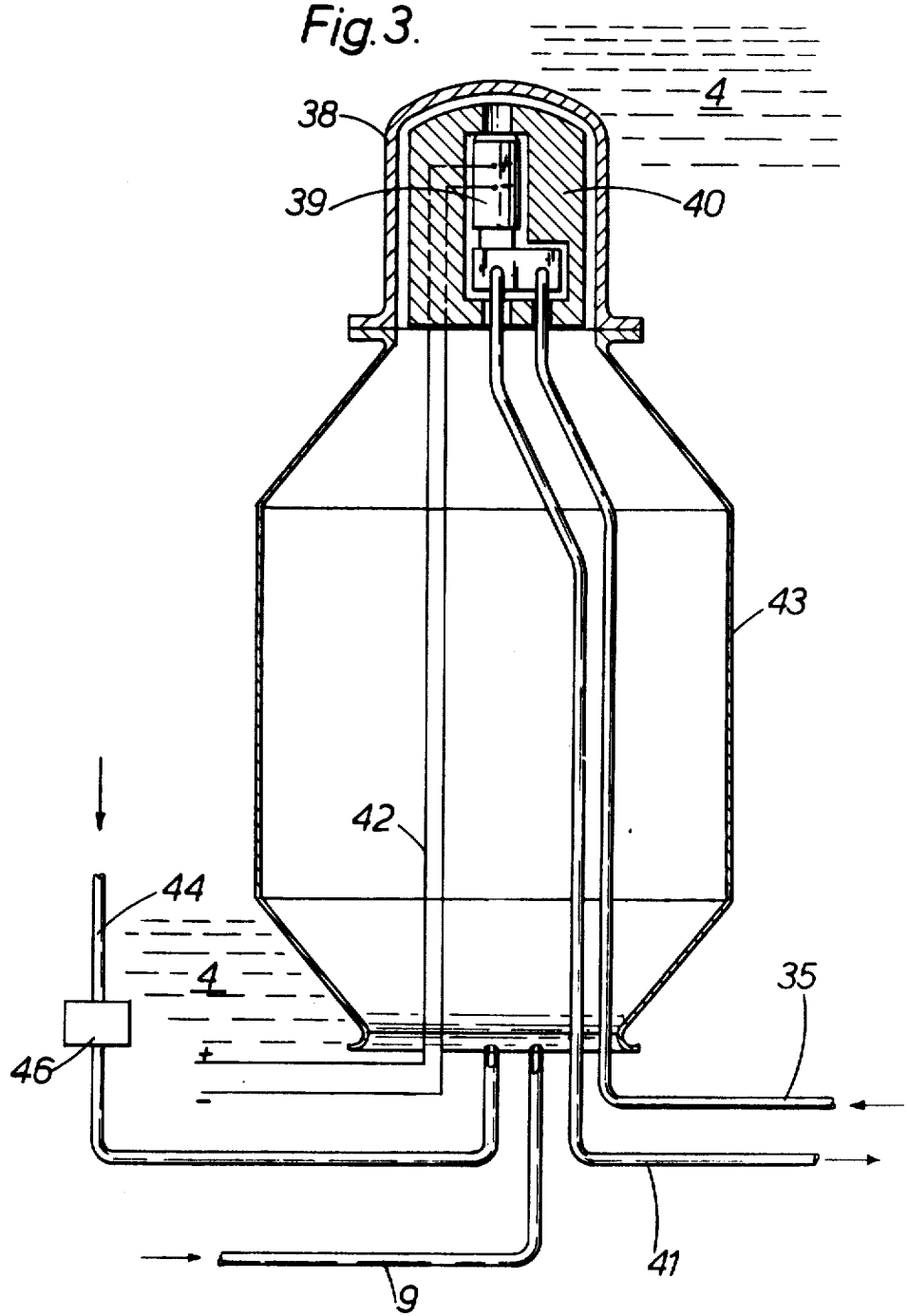
FIG. 3 illustrates the fuel pump and motor unit and how it is isolated within a gas environment.

A second pipe 9 (of smaller bore than pipe 8), is located above the level of pipe 8 in the wall of standpipe 7, and communicates with the fuel pump assembly (see FIG. 3). Both pipe 8 and pipe 9 pass through the wall of the standpipe 7 from the outside, to the inside, in a downwardly sloping direction. The level of this point of entry of pipe 9 is below the level of the other end of that pipe when it discharges into the fuel pump standpipe (see FIG. 3).

Located above the level of entry to pipes 8 and 9, is a metal diaphragm 10 which divides the standpipe 7 into upper and lower compartments. This diaphragm has a hole through the center; the underside of the hole being formed as a conical seating. An electrically operated solenoid 11 actuates a valve 12, by pushing the latter up into the conical seating on the diaphragm lower side when current is switched onto the solenoid. Valve 12, which operates in a loose-fitting guide 13 is of relatively large mass so that, except when the electric current is switched on to the solenoid the weight of the valve will ensure that it rests below, and well clear of, the diaphragm 10.

At any convenient position in the wall of that part of standpipe 7 above diaphragm 10, a third gas takeoff pipe 14 is located. This pipe supplies gas, on demand, to a cylinder 15 which has one end closed and the other end open to the surrounding water pressure region. Inside this cylinder is a movable piston 16, having conventional sealing rings 7, and also a piston return spring 18. Any gas which enters the cylinder via pipe 14, must return via the same pipe. This pipe is angled downwards in passing into the standpipe.

Both pipe and cylinder are surrounded by outer sheaths and porous packing 3.

Inside the combustion chamber 1 is an electrical heating element 19, supplied with current via insulated and gastight sealed terminals passing through the chamber. Also located inside the combustion chamber is a perforated sheet metal deflector plate 20, which serves to confine thermal convection currents in the trapped gas in the chamber (prior to operation of the fuel pump) so that the gas circulates substantially around the heating element 19, without contacting the cold walls of the chamber to any significant degree.

Located in the lower part of standpipe 7 is a small gas delivery pipe 21, which receives a supply of suitable gas (such as helium) form a storage bottle, via a pressure-regulating device 22, and discharges it into the standpipe whenever the water therein rises above a predetermined level. This level is monitored by regulator 22 which may be of any conventional design, such that it will sense variations in delivery pressure, in relation to the external hydrostatic pressure at any chosen level.

The manner of operation of this combustion chamber assembly is as follows:

When the system first submerges, water tends to rise up inside the standpipe, through the lower end thereof. Down to a depth of approximately 500 feet, this tendency is automatically and continuously countered by admission of helium (or other suitable gas) from pipe 21; thus maintaining a constant level of water in the standpipe 7.

When the system descends past the 500-foot level, as gas supply from pipe 21 ceases. Thereafter, as the system descends deeper, the water level will rise up in the standpipe, and thereby compress the trapped gas in all spaces at the top end. However, this rise of water level (as the system descends deeper) cannot be so great as to allow water to enter the combustion chamber space. This is because, in relation to the design maximum operating depth of any particular system, the maximum ratio of compression undergone by the trapped gas in descending to that depth (from the 500-foot level) will be insufficient to require all the available volume in the top of the standpipe (this latter volume being accurately calculated for that purpose).

For a period of time before it is intended to initiate combustion, electric current to the heater coil 19 is switched on. When the temperature of trapped gas therein has risen above the critical value for ignition of any particular monofuel, current is switched on to the electric motor which drives the monofuel supply pump. Fuel is thus sprayed by the injector (see FIG. 4) into the heated gas inside the combustion chamber, where it instantly ignites due to the pressure (as well as temperature) being above the necessary critical absolute value necessary for ignition. Thereafter, decomposition of the incoming fuel is self-sustaining, and the electric heater coil may be switched off.

The hot product gas thus generated instantly rises in pressure inside the combustion chamber and, so long as the fuel pump continues to operate, this gas passes out through the lower end of the combustion chamber and enters the space in the top of the standpipe, where it exerts a force on the column of water and depresses it; forcing the water down the standpipe until the small pipe 9 is uncovered.

Some of the product gas escapes up this pipe to the fuel pump shroud (see FIG. 3), but the quantity diverted for this purpose is very small compared with the total mass flow of gas issuing from the combustion chamber. Therefore, the water level in standpipe 7 is still further depressed, until pipe 8 is fully uncovered.

The total flow of gas then escapes up this pipe and into the particular buoyancy tank which it serves. This process will continue until the volume of gas thus collected in the top of that buoyancy tank has displaced the required amount of water therefrom; whereupon the fuel pump is stopped, and gas generation ceases.

Thereafter, (if the depth of the system remains constant) the level (if water will initially rise in standpipe (due to contraction on cooling of the volume of hot produce gas trapped inside), but will quickly attain equilibrium with the external hydrostatic pressure corresponding to a definite level of water in the standpipe. When the fuel pump is next restarted, and combustion recommences, pipes 8 and 9 are again automatically uncovered to receive their gas intake as before.

When it is desired to perform intermittent mechanical work by moving the piston 16, current is switched to solenoid 11 thus operating valve 12 to close the aperture in the underside of the diaphragm 10. This allows gas pressure in the top of the standpipe to build up (assuming combustion is taking place); which pressure is necessarily transmitted, via pipe 14, to the crown of the piston 16 and performs useful work in moving it against the opposing water pressure and return-spring force. This piston and cylinder assembly does not utilize the energy of the gas expansively, but only the pressure energy due to the relatively small difference between the raised gas pressure and the external water pressure. By suitable mechanical or hydraulic linkage to the piston, any required form of arcuate or linear intermittent motion may be imparted to an external mechanism (for example the claws of a mechanical grap or alternatively, the extension of a telescopic boom). When current to the solenoid is switched off, the valve 12 drops away from its seat in the underside of diaphragm 10, thus releasing pressure in the top part of the standpipe 7 and allowing spring 18 to return the piston to its original position in the cylinder; thereby displacing the gas, from the cylinder 15, back into the standpipe, via pipe 14.

With the arrangement described any liquid monofuel introduced into the combustion chamber and not burnt (for any reason such as for example, failure to obtain ignition), will fall into the water in standpipe 7 and will diffuse formlessly out of the open lower end of that pipe into the surrounding water environment; so obviating risk of subsequent explosion hazard. Also liquid fuel which thus drains away, cannot enter the gas supply pipes 8, 9 and 14 because of their upward inclination away from the interior wall of the standpipe.

The liquid monofuel storage tank assembly, shown in FIGS. 2, 2a and 2b, has an outer thin-walled rigid metal container, indicated at 23, and may be of any convenient shape (for example cylindrical with domed ends). This outer container (which is at all times submerged below the surface when the machine or vessel, to which it is attached, is in the water) has a number of holes 24, in its walls, for the purpose of freely admitting or venting the surrounding water medium 4.

An inner flexible bag 25, made of appropriate chemically resistant material, serves to contain the supply of liquid monofuel 26, which is introduced into the bag (and also withdrawn from it), by a relatively large-bore, thick-walled refuelling pipe 27, having a number of perforations in its closed end; which latter is located inside the bottom of the fuel bag 25, and extends for practically the whole length of that bag. The other end of this pipe passes through the wall of the flexible bag, via sealed joint 28, and also passes freely through a hole in the outer container 23, whence it extends upwards to a level substantially above the top of the outer container and there terminates in an open end fitting 29, of any conventional type suitable to afford detachable gas-and-liquid-tight connection with a mating fitting. This open end of the pipe 27 is normally sealed by a detachable cap 30 (FIG. 2b).

A small bore vent pipe, shown at 31, passes freely through a hole in the outer container and terminates inside in a T-junction; to the two arms of which are attached lengths of flexible hose 32 which, extending respectively to opposite ends of the upper surface of the flexible bag 25 communicate (via sealed joints 33), with the bag interior space. The other end of vent pipe 31 runs upwards from the top of the outer container 23 and is attached to the open top end of the refuelling pipe 27, via the end fitting 29. This end of the vent pipe is open and free to the atmosphere when the cap is removed, but is automatically sealed when that cap is in position. When the refuelling hose fitting 34 (FIG. 2a) is in place it does not cover the opening at the top end of vent pipe 31.

A fuel takeoff pipe 35, (for supplying the monofuel from the flexible bag to the fuel pump serving the combustion chamber) is joined to the refuelling pipe at any convenient position. A fuel drain cock is shown at 37.

When it is desired to fill the flexible bag with fuel (the machine or vessel being assumed floating in the water on the surface, with the top end fitting 29 clear of the surface) the cap is removed and the refuelling hose attachment 34 is fitted in its place. Before beginning to supply fuel, however, a supply of suitable inert gas (for example nitrogen or carbon dioxide) is forced at low pressure through the refuelling attachment and thence into the interior of the flexible bag 25, via the perforated holes in refuelling pipe 27, thus purging air from the interior of the bag and pipes. The inert gas escapes freely to atmosphere at the open end of the vent pipe 31.

The gas supply is stopped, after the requisite period of purging, and liquid monofuel is allowed to enter the refuelling pipe, (also via attachment 34), at low pressure; thereby inflating the flexible bag with fuel, until the latter is full and occupies most of the space in the outer container, from which it displaces the water out into the surrounding region through the holes in the container walls. When the bag is full, fuel rises up inside the vent pipe 31, until it is observed to be discharging freely from the open end, just below the refuelling hose attachment (as in FIG. 2a). Fuel supply is then stopped, the refuelling hose attachment 34 is removed and the cap is replaced.

If a particular monofuel has a liquid density very nearly the same as the density of water then, when the gas generating system is submerged at any depth, the pressure of fuel inside the flexible bag tank will be everywhere equal to the local ambient hydrostatic pressure at the same level outside; and the same state applies to the pressure of the fuel inside the pipe 27 and vent pipe 31. Also, any gas trapped inside the top of these pipes will be at a pressure corresponding to the hydrostatic pressure obtaining at the level of liquid in those pipes.

When the fuel pump is operating, however, the depression which it creates in the fuel takeoff pipe 35, sets up an unbalanced pressure difference between the fuel inside the flexible bag and the water region outside. As a result, the water hydrostatic pressure evenly squeezes the flexible bag, which slowly collapses as it forces fuel through the perforations in pipe 27, and into the takeoff pipe 35 leading to the pump inlet. As the bag collapses (due to discharging fuel in this manner), so water enters freely into the inside of the outer container 23 through the perforations 24.

Should the fuel pump be inadvertently left running for a sufficient period of time completely to use up all fuel in the flexible bag, then at the instant fuel starvation occurring at the pump inlet port, all pipes downstream of that position will be subject to a high external hydraulic crushing load, the value of which will depend on depth of operation and also on the pump delivery pressure as determined by pressure drop at the injector or by relief valve setting. The particular arrangement described (i.e. flexible fuel-storage bag and thick-walled fuel pipes) allows such a system to be designed satisfactorily to resist such overload conditions at great depth.

FIG. 3 shows the necessary arrangement for an hydraulic pump driven by an electric motor and intended to draw liquid monofuel, in demand from the fuel tank (see FIG. 2) and supply it at required delivery pressure and flow rate, to the combustion chamber injector.

When, for example, a submarine machine or vessel, to which the system is attached, is submerged, the fuel pump assembly is at all times completely surrounded by the external water region indicated at 4. A metal shroud, in the form of a "bell jar" shown at 38, is mounted in a substantially vertical position. The upper end is closed, but the lower end of the shroud is open. Inside this cylindrical shroud is mounted the combined electric motor and fuel pump unit 39.

Closely surrounding the outside profile of the pump/motor unit are packing pieces 40 made of any suitable material. These comprise two or more sections of convenient shape so that, when they are placed in position around the pump/motor unit and the unit is introduced into the shroud, the free-space volume inside the shroud is reduced to a minimum consistent with leaving small spaces between the inside of the packing and outside of the pump/water unit, and also between the outside of the packing and inside of the shroud cylinder.

A fuel pump intake pipe 32 from the tank (see FIG. 2); a fuel delivery pipe 41, and electric cables 42, enter the interior of the shroud 38 via the open lower end. Attached to the bottom of the shroud (in a gastight manner) is a standpipe 43, which extends downwards for a distance dependent on the intended maximum depth of operation of any particular system, and on the standpipe volume per unit length. The fuel pipes 35 and 41, and electric cables 42 enter this standpipe at its lower end, where the latter is in open communication with the surrounding water pressure region. Also, to separate gas delivery pipes 44 and 9 each enter the lower end of the standpipe and there terminate.

Pipe 44 receives an intermittent supply of low-density inert gas (for example helium) via a pressure-reducing valve 46 which serves automatically to maintain delivery pressure at a value slightly greater than the local ambient hydrostatic pressure corresponding to the level of the bottom of standpipe 43. This helium gas is stored in conventional high-pressure storage bottle located in any convenient position on the submarine machine or vessel which the system serves.

Pipe 9 is the gas supply pipe from the combustion chamber (see FIG. 1) and delivers combustion product gas whenever the fuel pump is operating.

The manner of operation of this fuel pump assembly is as follows: When the submarine vessel or machine (to which it is attached) first submerges, and before it attains a depth exceeding approximately 500 feet below the surface, helium from the storage cylinder is supplied to pipe 44, via regulator 46 (as described) and issues into the interior of standpipe 43; whence it rises up as bubbles through the column of water which must be present in the standpipe.

This helium gas will preferentially collect in the top of the standpipe (and in the small spaces around the pump/motor unit inside the shroud cylinder above it) to the exclusion of any air trapped therein which, owing to its heavier constituent gases, and apart from any air which may diffuse into the helium and vice versa will necessarily occupy a lower level than the helium gas. This admission of helium, at a controlled pressure not less than the pressure corresponding to the local hydrostatic value to the open end of standpipe 43, necessarily depresses the water column to the bottom of that standpipe, and maintains it there all the way down to the depth of 500 feet.

Thereafter, as descent continues, no further helium is admitted and consequently the water level in the standpipe rises to a level which, at any particular depth of the system below the surface, is proportional to the ratio of compression of the trapped gas in the pipe; (which ratio is proportional to the hydrostatic pressure at that particular depth divided by the hydrostatic pressure at 500 feet). However, water can never enter the pump/motor unit shroud 38, because the clearance therein (i.e. free-space volume left by the packing 40 is very small compared with the large volume of the standpipe 43; thus, for any depth obtainable in the oceans, the ratio of compression would be too small to compress the trapped helium sufficiently to allow water to enter shroud 38.

After the depth of descent has passed beyond approximately 500 feet, the pump/motor unit may be switched on to initiate combustion of monofuel (as previously described). Some of the product gas generated is then automatically bypassed to pipe 9 (see also FIG. 1) and enters the standpipe 43; depressing the water therein to the level of the open bottom end.

If a particular monofuel generates product gas of an analysis containing a proportion of hydrogen among its constituent gases this hydrogen will tend to collect at the top of the standpipe, inside the pump/motor shroud 38 to the exclusion of the heavier helium gas which other than for any diffusion which may take place will tend to be displaced downwardly. Certain constituent gases may be partially absorbed in the water when bubbling up through it. Any gases not so absorbed, will generally occupy levels below the low-density helium and hydrogen gases above them and, after a period of gas generation (i.e. after the motor/pump unit has been running for a short time), the whole of the standpipe and shroud cylinder internal spaces will be full of hydrogen gas only; any further gas entering via pipe 9 will pass out as bubbles through the open bottom end of the standpipe 43.

This arrangement of the fuel pump assembly assures that a hydrogen environment or an environment consisting almost entirely of hydrogen is always present around the pump/motor unit, when the latter operates. This is desirable in order to reduce the armature windage loss to a minimum (when the submarine machine or vessel is at great depth) and to encourage cooling of the electric motor windings, (by taking advantage of the low density and high specific heat of hydrogen). Any fuel leakage from inside the fuel pump to the outside will fall harmless down to the bottom of the standpipe and diffuse into the surrounding water region.

The same sequence of fuel drainage follows if liquid fuel is discharged from a pressure-relief valve located in the pump body.

Figure 4:
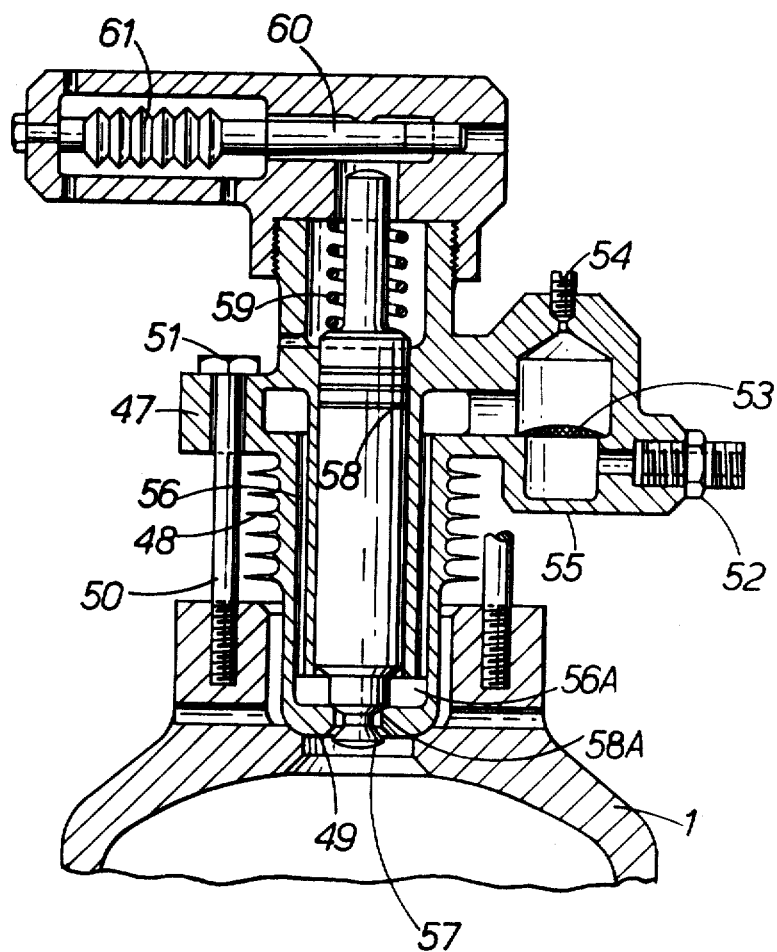
FIG. 4 is a section through the fuel injector, showing provision for fuel cooling and fuel droplet exit velocity control.

FIG. 4 shows a longitudinal section through the fuel injector. A body 47, of suitable metal alloy with high thermal conductivity, has water-cooling fins 48 on the outside surface. The cylindrical lower part of this injector body has formed at its end a nozzle 49 having an external spherical seating formed thereon. This registers against a matching seating, of narrow face width, formed in the top of the combustion chamber (indicated at 1; set also FIG. 1), which communicates with the interior of that chamber. The two component parts are held firmly together, at the spherical seating, by a number of locating studs 50 (the lower ends of which are attached to the combustion chamber top boss) and nuts 51, so as to provide a gastight seal against the pressure of combustion.

Fuel from the pump (see FIG. 3) is admitted to the interior of the upper end of the injector body 47, via an inlet union 52; whence it flows upwards through a filter 53 and into a space at the top of the body. A small vent screw 54 is located at the highest point of the body, to make provision (when the fuel point is being primed on the surface, prior to submerging) for bleeding off any trapped gas. Sediment, collected by filter 53 falls into sump 55.

A number of small-bore passages 56, are formed in the injector body, and serve to conduct the fuel down to nozzle 49. Inside the nozzle, the fuel issuing from the lower end of these passages collects in annular space 56A surrounding the small diameter lower end of a centrally located long valve 57. The lower end of this valve is conical and is kept in contact with a matching conical seat 58A formed inside the nozzle, just above short exit passage at the extreme tip of the nozzle which communicates with the combustion chamber interior. The upper end of the valve, which is of larger diameter, is a close sliding fit in a central bore formed in the injector body; seals 58 preventing egress of fuel.

The top of valve 57 passes out through the upper end of the injector, where it is surrounded by the water environment. The extreme tip of the lower end of the valve (just beyond the conical seating 58A) is in the form of a very short cylindrical plug having a taper of reverse direction relative to the taper of the conical valve seat above it. This is matched by a short cylindrical inside taper of the exit orifice in the nozzle tip; thus small axial displacement of the valve 57 serves to vary the cross-sectional area of the annular space between valve plug tip end and the discharge orifice walls.

Such axial upwards movement of valve 57 is resisted by spring 59 and is limited, in extent of travel, by stop 60; the position of which, at any operating depth of the system, is determined by the degree of compression undergone by a capsule 61, which is sensitive to changes in the local ambient pressure of the water which surrounds it. As a result of this arrangement, when the valve 57 is lifted off its seat 58A and brought to rest against stop 60, the effective exit area of the nozzle varies according to the length of the capsule 61 which, in turn, depends upon the depth of operation below the surface of the water environment 4.

The manner of operation of the injector unit is as follows: Assuming that the system is correctly primed on the surface before the submarine machine or vessel submerges then, when the fuel pump is at rest (and combustion is therefore not taking place) the pressure of the liquid monofuel in the supply tank, fuel supply lines, pump and injector units, will be everywhere equal to the external hydrostatic pressure. When the fuel pump is started, fuel is delivered to injector at pressure which, rising almost instantaneously to a value sufficiently above local ambient hydrostatic pressure, exerts an hydraulic upwards force on the relatively large annulus area exposed to the fuel by the valve 57 (in the annular space 56A above the conical valve seat); which force overcomes the opposing pressure of externally mounted spring 59, and thus lifts the valve off its seating (movement being then arrested by stop 60).

Fuel now flows at high velocity past the valve seating and is forced through the annular, taper-plug orifice; whence it issues in the form of an atomized conical-shaped spray into the combustion chamber space. The fuel droplet particle exit velocity thus depends (for a given fuel mass-flow delivery condition) upon the effective nozzle exit area at any particular time. This area, as described, is indirectly dependent upon the depth of the system below the water surface, at that time.

Once combustion is in progress, the walls of the combustion chamber will necessarily rise in temperature. However, the rate of heat transfer to the injector body, (via the narrow-width spherical seating contact), will be low; such heat being instantly surrendered to the surrounding water by external cooling fins 48. In this manner, fuel flowing down the small-bore, long passages 56 will not be raised significantly in temperature, until it issues as spray into the combustion chamber.

The volume of the fuel space around the lower end of valve 57 is made very small. When the pump is stopped, (and fuel pressure in this area therefore collapses), spring 59 snaps the valve down on its seating; so instantaneously and cleanly terminating fuel spray. Should the local temperature of the fuel, thus trapped above the seating, accidentally rise too high so that the fuel suffers spontaneous decomposition, the resulting detonation will be harmless; because the shock wave will be damped out by the long small-bore passages 56, and the local pressure rise (of the very small amount of fuel in the lower annular space 36A thus decomposed), will lift valve 57 momentarily off its seat; thus allowing the gases to escape into the combustion chamber.

Figure 5:
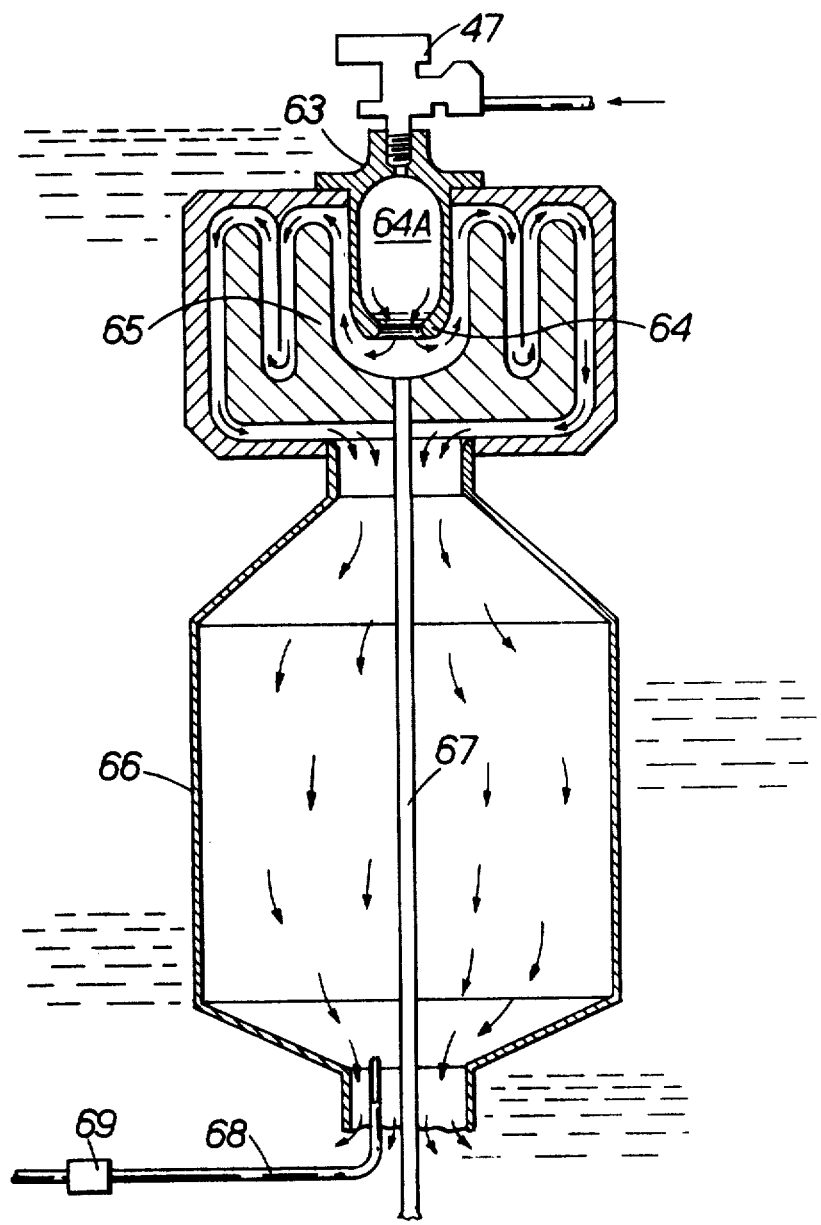
FIG. 5 depicts an alternative arrangement of combustion chamber intended to extract heat energy from the gas and transfer it to a fluid contained within a heat exchanger.

FIG. 5 shows an alternative combustion chamber assembly, which employs identical principles of operation as explained for the assembly shown in FIG. 1 but, in this case, with the intention of supplying the hot gas, generated in the chamber, direct to a suitable heat-exchanger unit, unit, without significant loss of heat content of the gas while passing from the combustion chamber to the heat exchanger. The latter may be of any suitable conventional design which will satisfactorily absorb the heat from the hot product gas, (which is initially at high temperature), and transmit this heat freely to a working fluid contained within the heat exchanger; while, at the same time resisting the high external pressure imposed upon it by the hot product gas which, (for reasons previously explained), is always at a pressure slightly above the value of the local ambient hydrostatic pressure at the gas exhaust outlet to the surrounding water region.

A combustion chamber 64 is mounted with axis vertical and has a fuel injector 47 (see FIGS. 4 and 5) secured at the top. Hot product gas issued directly from a large-diameter orifice, 64A, located at the lower end of the combustion chamber and enters the interior hot gas passages formed in the heat exchanger 65. The direction of gas flow is reversed by the shape of the internal passages, so that it flows back over the outer surface of the combustion chamber 64. Thereafter, the gas flow may traverse any desired number of flow-reversing cascades (located in the heat-exchanger gas passages), before leaving the latter and entering a large-capacity standpipe 66, which is attached (in a gastight manner) to the annular gas outlet port of the heat exchanger; extending thence below the latter for a definite vertical distance the extent of which depends upon the ratio of internal volume of the standpipe in relation to the combined internal volumes of the heat-exchanger gas passages and combustion chamber.

The product gas, (at reduced temperature), when it enters the top of this standpipe 66, necessarily depresses the level of any column of water therein. When the level of the water column is thus forced down to the open bottom of the standpipe, the product gas exhaust flow thereupon escapes to the surrounding water region. Thus, the pressure of combustion is always equal to the hydrostatic pressure at the bottom of the standpipe, plus an additional small pressure the value of which depends upon the pressure drop through the heat exchanger for any given gas mass-flow conditions.

A fuel drain pipe 67 is located in the heat-exchanger block below the point of gas exit from the combustion chamber. This pipe passes, in a gastight manner, through holes in the heat-exchanger block, and projects below the latter, down to a level which is substantially greater, in terms of vertical distance, than the level of the bottom of standpipe 66. This fuel drain pipe 67 has an open lower end, down which any unburnt fuel will fall by gravity (when combustion is not taking place) and diffuse out harmlessly from the open lower end into the surrounding water.

A gas delivery pipe 68 is located in the lower end of standpipe 66. This pipe receives gas via an automatic pressure regulator 69, from a conveniently located high-pressure storage bottle. The gas may be any inert gas, such as nitrogen, carbon dioxide or helium. Its pressure of entry is controlled, by the regulator 69 in such a manner that this pressure (down to a depth of approximately 500 feet) cannot follow the corresponding local ambient hydrostatic pressure at any chosen level near the bottom of standpipe 66.

In operation, (and during initial descent of the system from surface level down to 500 feet), the inert gas issues continuously into the standpipe and prevents the water level from rising therein. Thereafter as the depth of the system increases, gas flow from the storage bottle supply ceases, and a column of water rises progressively up the inside of the standpipe (so long as combustion is not taking place). Water cannot however, enter the heat exchanger or combustion chamber, for reasons previously explained in relation to FIGS. 1 and 3.

Furthermore, when combustion is taking place, gas will always travel along the path through the heat exchanger and thence out from the bottom of standpipe 66, in preference to the alternative route passing down the fuel drain pipe 67 (because of the greater hydrostatic back pressure exerted at the level of the bottom of that latter pipe).

FIG. 6 is a combined diagram of electric, fuel and gas circuits, showing the functional and positional relationship of the various components of the system. The combustion chamber, and standpipe assembly is here represented at 70. Its injector unit is connected by an hydraulic pipe 71 to the delivery side of the fuel pump (see FIG. 3) which is shown as an assembly at 72.

The fuel tank assembly (see FIGS. 2, 2a and 2b) is shown in this circuit diagram at 73. A pipe 74 receives fuel from the tank and conducts it to the inlet side of the fuel pump. This pipe 74 which normally operates under conditions of very small excess of external water pressure over internal fuel pressure, may (under circumstances of sudden fuel starvation) be subject to a very large externally applied hydraulic crushing load; in consequence its wall thickness and material of construction must be adequate to withstand such loads.

A large product gas supply pipe 8 connects the lower interior space of the combustion chamber standpipe, to the interior of any buoyancy tanks which it is intended to serve (as indicated at 76).

Pipe 8 operates, at all times, under conditions of nominal zero pressure difference between the inside and outside fluid mediums. The location of the outlet of pipe 8 into any buoyancy tank 76 which is served by the pipe 8 must be such that vertical relationship of the outlet switch 86 pipe 8 and the outlet of the standpipe is as indicated by the arrow 78. A mechanically or electrically operated valve 79 would normally be included in the circuit, for the purposes of controlling the venting of gas from the buoyancy tanks.

A small gas pipe 9 connects the lower interior space of the combustion chamber standpipe to the fuel pump assembly standpipe. This pipe 9 also operates at all times under conditions of nominal zero internal to external pressure difference. The vertical relationship of the outlet of this pipe above the outlet of the standpipe is as indicated by the arrow 80.

A small bore pipe 81, receives high-pressure gas, such as helium, form a storage cylinder 82 and distributes it to two pressure regulators 46 and 22. Each of these regulators automatically and continuously delivers the helium gas at an outlet pressure not less than the hydrostatic pressure obtaining locally at the approximate level of the bottom of that particular standpipe which it serves. Below a depth of approximately 500 feet, however, each of these regulators automatically terminates further supply of helium to its respective outlet pipe.

An electrical storage battery, shown at 83, is connected via a switch 88 and rheostat control unit 85, to the windings of the electric motor which drives the fuel pump (here shown as an assembly at 72). Switch 86 connects the battery supply to the heater coil inside the combustion chamber (shown as an assembly at 70). A series of switches 88 may supply electric current to any number of buoyancy tank gas vent valves, as necessary.

The motor control unit 85 is of any conventional design whereby torque and speed of rotation of the pump motor may be set to any required value within design limits. The fuel pump, thus driven, is of any conventional type whereby fuel mass flow delivered is a function of pump rotation speed. Since the volume of a given mass of product gas generated (at any fixed temperature) must, by laws of thermodynamics and hydrostatics, vary inversely (in hyperbolic order) as the depth of operation of the system below the surface, and since also the loss of volume of a given mass of gas trapped inside an open bottom buoyancy tank will vary directly in the same manner, it is apparent that the mass of generated gas required to replace the lost volume in the buoyancy tank in respect of any fixed increment of vertical depth will be constant (at constant temperatures).

Thus, with this invention a given increase in depth requires a fixed corresponding mass flow of fuel to restore negative buoyancy to a chosen constant value, irrespective of the mean depth of the system below the surface. Since, therefore, the motor control unit 85 is so arranged, (as previously described) to give positive control of fuel mass flow delivered to the injector, it follows that a given setting of the indicator of this control will determine a corresponding constant order of negative buoyancy during descent.

The indicator dial of this control is therefore suitably calibrated (in relation to any particular system which it serves) so that rate of vertical descent may be directly selected on it. Thus, a particular setting will ensure a corresponding constant rate of descent below a depth of 500 feet of the submarine, machine or vessel.

What I claim is:

1. A submersible system for converting a liquid monofuel into gas comprising a fuel storage tank, a combustion chamber for the fuel, a hollow vessel in communication with the combustion chamber through a lower wall thereof and in communication with local ambient hydrostatic pressure at a position remote from the combustion chamber, a variable delivery fuel pump operable to deliver a quantity of fuel to the combustion chamber and means for distributing gas generated by decomposition the fuel, the combustion space within the combustion chamber being subjected to the local ambient hydrostatic pressure of the water in which the system is submerged, said combustion chamber having a downwardly directed concave lower end wall and an internal volume less than the internal volume of the hollow vessel.

2. A system according to claim 1 wherein the fuel is delivered at a velocity which is dependent on the local ambient hydrostatic pressure.

3. A system according to claim 1 wherein the generated gas is fed into a buoyancy tank for the purpose of varying the submerged displacement of a submarine vessel including the system.

4. A system claimed in claim 1, wherein the generated gas is passed through a heat-exchanger heat-exchanged device for the purpose of abstracting heat energy from the gas.

5. A system according to claim 1 including an energy source for driving the variable-delivery pump and means for releasing the energy at a controlled rate.

6. A system according to claim 1 wherein the hollow vessel is a standpipe.

7. A system as claimed in claim 6, including one or more external gas supply pipes which communicate with the standpipe at points remote from the combustion chamber and in a direction such that these external pipes enter the standpipe in a downwardly sloping direction so that gas, contained within the standpipe, may escape whenever the level of water in the lower end of the standpipe is below the level of entry of the external pipe(s) into the standpipe.

8. A system as claimed in claim 7, including an additional gas supply pipe which communicates with the interior of the combustion chamber standpipe through an open lower end thereof, the additional supply pipe serving to admit gas, at a pressure at least equal to the hydrostatic pressure corresponding to a particular chosen level of water in that standpipe.

9. A submersible system for converting a liquid monofuel into gas comprising a fuel storage tank, a combustion chamber for the fuel, a variable-delivery fuel pump operable to deliver a quantity of fuel to the combustion chamber and means for distributing gas generated by decomposition of the fuel, the combustion space within the combustion chamber being subjected to the local ambient hydrostatic pressure of the water in which the system is submerged including a thin-walled external sheath of perforated metal surrounding the combustion chamber so as to leave a space between the sheath and the combustion chamber, and located in the said space in a manner which allows water which surrounds the outside of the sheath to penetrate into the interstices of the porous packing, said system also including an electrical heating element for raising the temperature of any gas trapped within the chamber, the rise in temperature being achieved by reason of the shape and extent of a heat-resistant gas deflector, the latter being such as to cause the trapped gas in the combustion chamber to circulate around the heating element by thermal convection during the supply of current to the heating element.

10. A system as claimed in claim 9, wherein the heat resistant gas deflector is supported clear of contact with the inner walls of the combustion chamber and has a shape and extent whereby any convection currents of heated trapped gas are circulated substantially within the space contained by the deflector, so as to reduce heat losses from the gas to the walls of the combustion chamber.

11. A system as claimed in claim 10, wherein the combustion chamber has an external boss having a hole which communicates with the interior of the combustion chamber and which is counterbored to form a seating area for receiving a liquid monofuel injector device having a nozzle which has a shape corresponding to that of the seating area.

12. A system as claimed in claim 11 wherein a liquid monofuel injector device includes a valve which is axially movable within the injector body under the influence of a spring so as to vary the effective fuel discharge orifice area of a nozzle, the extent of the axial movement of the valve being controlled by the position of an adjustable stop the position of which is regulated by the degree of contraction or expansion of a device which is responsive to changes in the local ambient pressure of surrounding water in which the system is submerged.

13. A system as claimed in claim 12, wherein the injector body includes a number of long fuel passages of small diameter so that the fuel flow from the supply pump is divided and passes through these passages in parallel flow; the individual ratio of length to bore diameter of each passage being sufficiently high to cause damping of any shock wave originating in the fuel due to local detonation of the latter in any areas downstream of these passages.

14. A system for converting a liquid monofuel into gas comprising fuel storage tank, a combustion chamber for the fuel, a variable-delivery fuel pump operable to deliver a quantity of fuel to the combustion chamber and means for distributing gas generated by decomposition of the fuel, the combustion space within the combustion chamber being subjected to the local ambient hydrostatic pressure of the water in which the system is submerged, wherein the liquid monofuel storage tank device comprises an outer hollow container having walls which are perforated or otherwise vented to the surrounding water medium, an inner bag of flexible material for containing the monofuel, a pipe having a relatively large bore and a relatively thick wall sealed into the wall of the flexible bag and terminating therein in the form of an extension having locally perforated walls and a blind end the other end of the pipe passing freely through the wall of the outer container.

15. A system as claimed in claim 14, including a pipe of relatively small bore having a plurality of flexible branches with their free ends sealed into the wall of the flexible bag, the flexible branches being such that as the bag collapses or expands the branch pipes are free to follow such movement without constraint the upper end of the unbranched portion of the pipe being positioned substantially above the level of the top of the outer container through the wall of which the said portion freely passes.

16. A system as claimed in claim 15, wherein the upper ends of both large-bore and small-bore pipes enter a single union having a detachable cap which, when attached, closes the large and small bore pipes in a fluidtight manner and when detached opens the said pipes thereby exposing their respective large and small diameter separate terminal orifices.

17. A system as claimed in claim 16, including a refuelling hose having a detachable hose end fitting for receiving liquid monofuel or inert gas separately or together, the refuelling hose being attachable to the union of the large and small bore pipes of the fuel tank flexible bag, and in a manner of attachment which leaves the upper end of the small bore pipe open to the surrounding natural atmospheric region, but at the same time allows fuel to flow down the larger bore pipe.

18. A system as claimed in claim 14 wherein a pipe of relatively small bore has wells of material gauge adequate to withstand an infrequently applied high external fluid pressure, communicates at one end with the inside of the large bore pipe, at any convenient position in the wall of the latter and communicates at the other end thereof with the inlet port of the variable-delivery fuel pump in such a manner that, when the latter operates, the depression of pressure thereby caused in the interior of this pipe having a relatively small bore will cause the liquid monofuel to flow from the flexible bag to the variable delivery fuel pump.

19. A submersible system for converting a liquid monofuel into gas comprising a fuel storage tank, a combustion chamber for the fuel, a variable delivery fuel pump operable to deliver a quantity of fuel to the combustion chamber and means for distributing gas generated by decomposition of the fuel, the combustion space within the combustion chamber being subjected to the local ambient hydrostatic pressure of the water in which the system is submerged, the fuel delivery pump being a hydraulic pump driven by an electric motor, the pump and motor being mounted within the upper portion of a hollow pipe assembly having a closed top end and a lower end open to the surrounding water pressure region; and said hollow pipe assembly being mounted, in use, in a substantially vertical attitude, so that said hollow tube may be termed a "standpipe."

20. A system as in claim 19, wherein the hydraulic pump and motor assembly is surrounded closely by solid material of a nature substantially impervious to the absorption of gas, in a manner which reduces the volume of free space inside the upper end of the standpipe so that that volume is less than the remaining volume inside the lower end of the standpipe.

21. A system as in claim 19, wherein one or more pipes, of relatively small bore, enter the lower end of the standpipe and may deliver (as and when required) a quantity of gas into the inside of the standpipe, at a gas delivery pressure sufficient to depress the local level of water in the standpipe down to a desired datum level.

22. A system as in claim 19, wherein a fuel delivery pipe and a fuel inlet pipe enter the open lower end of the standpipe and pass upwards therein to their respective union connections on the hydraulic pump body.

23. A system as in claim 19, wherein electric power supply cables enter the open lower end of the standpipe and pass upwards therein to their respective terminal connections on the body of the electric motor.

24. A system as claimed in claim 5, wherein the energy source is an electrical storage battery.

25. A system as claimed in claim 22, including an electrical control rheostat in circuit with the battery and the electric motor which drives the monofuel pump so as to permit variation of the rate of energy release from the battery.

26. A system as claimed in claim 7, wherein one or more of those gas supply pipes, which enter the standpipe, is of relatively large bore size and communicates, at its other end, with the inside of the buoyancy tank of a submarine vessel, the arrangement being such that, whenever the water inside the standpipe is depressed by reason of the superior pressure of generated gas above it, and issuing from the combustion chamber outlet to a level which is below the level of entry of the gas supply pipe, the gas will flow from the standpipe end up the gas supply pipe and into the buoyancy tank.